Jan. 6, 1953  H. C. CUNNINGHAM  2,624,826
ELECTRIC HEATING

Filed Jan. 16, 1951  3 Sheets-Sheet 1

HARRY C. CUNNINGHAM
INVENTOR

BY
ATTORNEY

Jan. 6, 1953  H. C. CUNNINGHAM  2,624,826
ELECTRIC HEATING
Filed Jan. 16, 1951  3 Sheets-Sheet 2
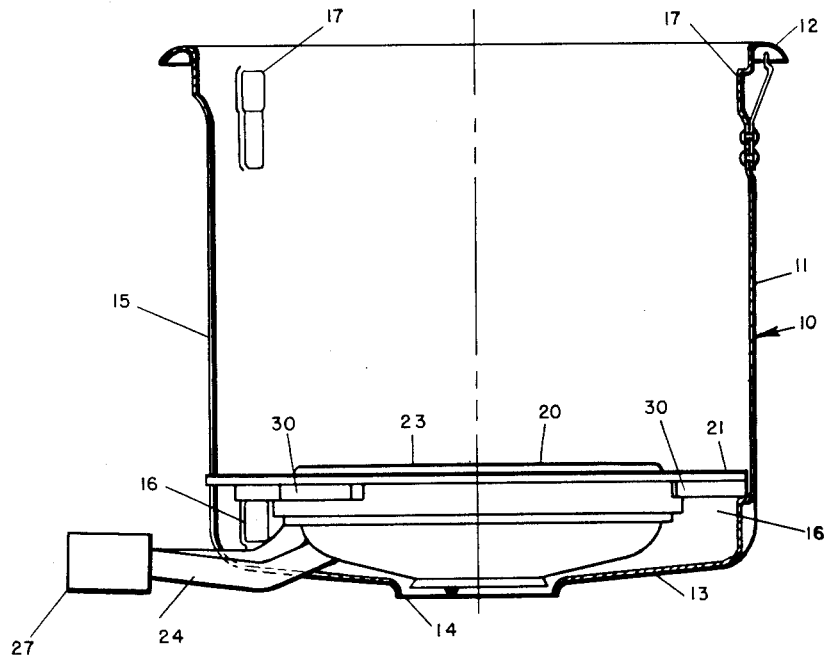
FIG.-2
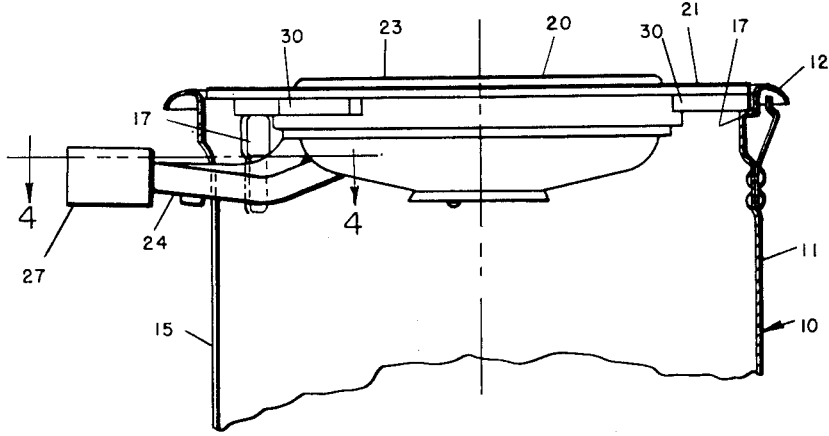
FIG.-3
HARRY C. CUNNINGHAM
INVENTOR
BY 
ATTORNEY

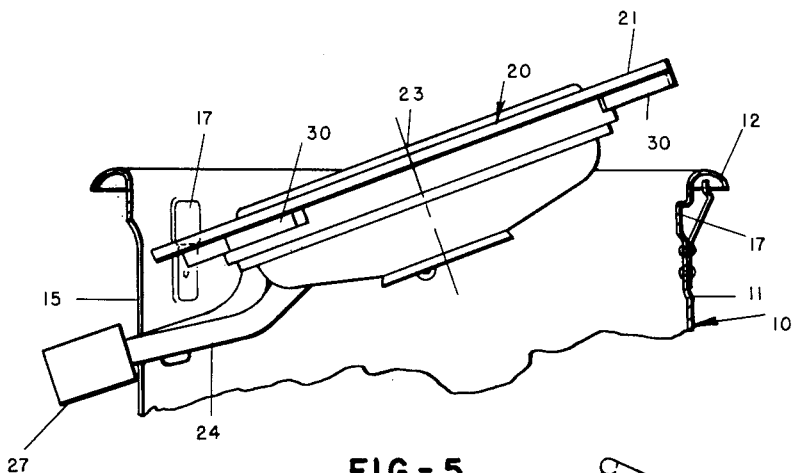
FIG.-5
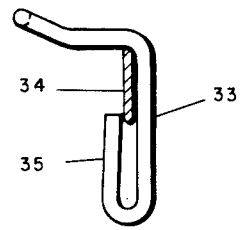
FIG.-7
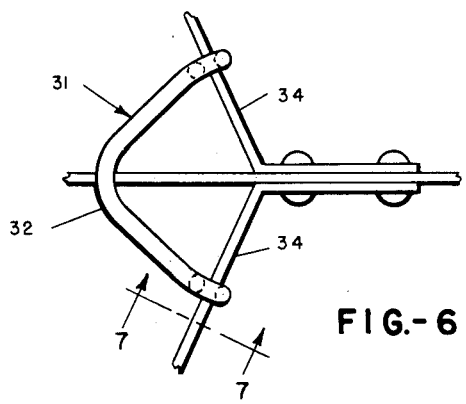
FIG.-6
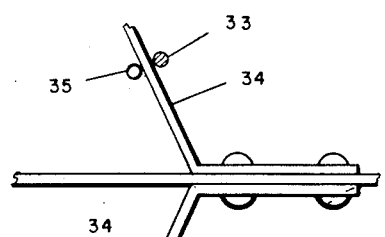
FIG.-9
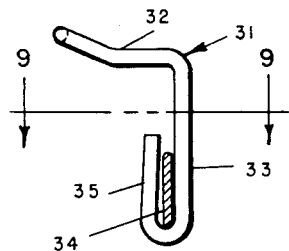
FIG.-8
HARRY C. CUNNINGHAM
INVENTOR
BY 
ATTORNEY Patented Jan. 6, 1953

2,624,826

UNITED STATES PATENT OFFICE 2,624,826

ELECTRIC HEATING

Harry C. Cunningham, Pittsburgh, Pa., assignor to Edwin L. Wiegand Company, Pittsburgh, Pa., a corporation of Pennsylvania Application January 16, 1951, Serial No. 206,163

4 Claims. (Cl. 219—37)

My invention relates to electric heating and the principal object of my invention is to provide an improved electric heating device of the genus characterized by a movable electric heating unit and a receptacle having provision for supporting said heating unit in a plurality of operative positions.

In the drawings accompanying this specification and forming a part of this application I have shown, for example, a deep well cooker comprising a receptacle constructed to support the electric heating unit in a lower position for deep well cooking and in an upper position for use as a surface unit, and what I now consider to be the best mode of embodying my invention in this specific device, and in these drawings:

Figure 2 is a view on the line 2—2 of Figure 1, with the receptacle in section and the heating unit in elevation;

Figure 3 is a partial view, similar to Figure 2, with the heating unit in its upper position;

Figure 5 is a partial view, similar to Figures 2 and 3, illustrating the manner of passing the electric heating unit between its upper and lower positions;

Figure 6 is an enlarged detail view, showing the handle for raising and lowering the heating unit;

Figure 7 is a partial section on the line 7—7 of Figure 6, with the handle in nested position;

Figure 8 is a view similar to Figure 7, with the handle in raised position; and

Figure 9 is a partial section on the line 9—9 of Figure 8, further illustrating the application of the handle.

Figure 1:
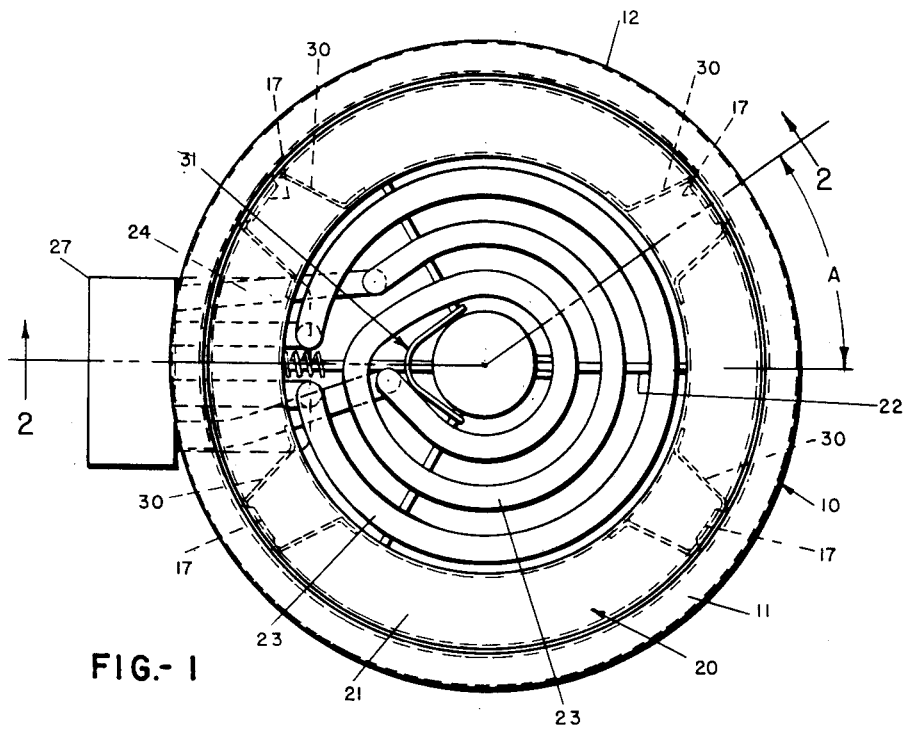
Figure 1 is a top view of the selected structure, with the heating unit in its lower position.
Figure 4:
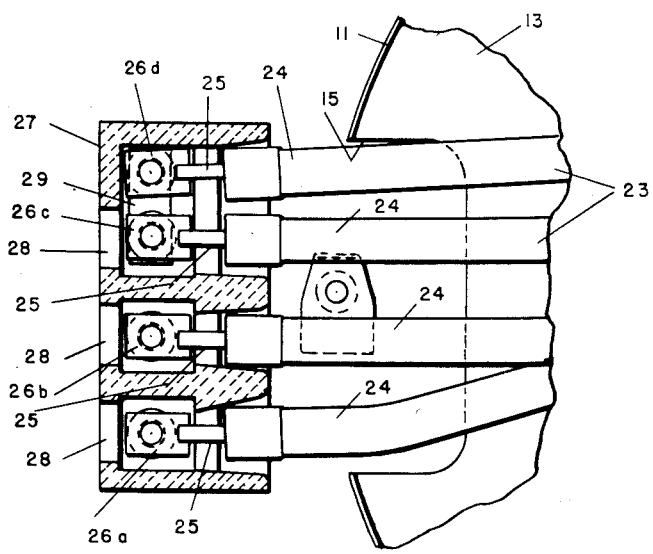
Figure 4 is an enlarged partial view, on the line 4—4 of Figure 3.

The device shown in the drawings comprises a sheet metal receptacle 10 including a substantially cylindrical body 11, an outward flange 12 at the upper end of the body 11 serving to strengthen the upper part of the body 11 and to support the device from and in an opening in, for example, the top of an electric range or hot plate, and an inward flange 13 at the lower end of the body 11 serving to strengthen the lower part of the body 11 and provided with a central opening 14 permitting a flow of air through the receptacle 10, the wall 11 and inward flange 13 further being provided with a substantially vertical slot 15.

The present device also comprises an electric heating unit 20 movable within the receptacle 10 and including a ring 21, a spider 22 suitably supported by the ring 21, and the two tubular electric heating elements 23 suitably supported by the spider 22, including end portions 24 extending through the slot 15 of the receptacle 10, and provided with terminals 25 received by connecting means 26 contained by a suitable terminal block 27 provided with openings 28 for the passage of conductors to be secured to the connectors 26, the present embodiment having the connector 26d joined to the connector 26c by a jumper 29, and the present terminal block 27 therefore being provided with only three openings 28, for the passage of conductors only to the connectors 26a, 26b, and 26c.

According to the present embodiment the slot 15 of the receptacle 10 is only slightly wider than the span of the heating element end portions 24, whereby the heating unit 20 is held against substantial rotation, and the heating unit 20 is supported in its lower and upper positions by circumferentially spaced projections 30 secured to the heating unit ring 21 and resting respectively on correspondingly circumferentially spaced lower and upper bosses 16 and 17 provided by pressing inwardly the particular portions of the receptacle body 21.

With this construction the heating element 20 may be moved from its lower position to its upper position by tilting it as indicated in Figure 5, raising it until the projections 30 are above the upper bosses 17, and then lowering it into position with the projections 30 resting on the bosses 17, and from its upper to its lower position by raising and tilting it, and then lowering it into position with the projections 30 resting on the lower bosses 16.

In the present embodiment the raising and lowering of the heating element 20 is conveniently accomplished by means of the handle 31 shown particularly in Figures 6 through 9 and comprising a center portion 32, vertical portions 33 extending from the ends of the center portion 32 along the two arms 34 of the spider 22, and retroverted portions 35 extending along the other sides of the spider arms 34 and of an extent to prevent accidental disengagement of the handle in its nested position, the relation in that position being indicated in Figure 7, and in the active position in Figure 8.

However, unless the bosses 17 are suitably arranged, pressure on areas of the heating unit 20 intermediate the locations of the bosses is capable of causing accidental tilting of the heating unit 20 and thus accidental dropping of the heating unit to its lower position, obviously susceptible of undesirable consequences, and therefore it is a feature of my invention that the bosses 17 are constructed and arranged to permit intended movement of the heating unit from one position to the other, but to prevent the undesirable accidental transition.

In the present embodiment this is accomplished by providing two pairs of bosses 17, and likewise two pairs of heating unit projections 30, one pair located approximately on one diameter and the other pair located approximately on another diameter disposed at an angle from the one diameter not less than approximately sixty degrees and not more than approximately eighty degrees, and preferably approximately seventy degrees.

Further, desirably the one diameter is displaced one way from a mean diameter through the center of the slot 15, as indicated at A in Figure 1, and the other diameter the other way, each approximately one-half the total angle.

In the present embodiment the flange 13 at the lower end of the receptacle body 21, prevents tilting of the heating unit 20 to permit the heating unit to pass or drop below the lower bosses 16, but to cooperate with the heating unit projections 30 the lower bosses 16 are located similarly to the upper bosses 17, and in the absence of the flange 13 such location further would supply the same advantage in respect of accidentally dropping below the lower position.

From the foregoing it will be apparent that the illustrated embodiment of my invention accomplishes at least the principal object, and on the other hand, that various changes and alternatives may be made and provided, and therefore the present disclosure is to be regarded as illustrative only, and my invention is to be regarded as defined by the following claims, and I claim:

1. An electric heating device comprising a receptacle and an electric heating unit movable in said receptacle between an upper position and a lower position, said receptacle comprising means constructed and arranged to support said heating unit in said lower position and including four supporting projections on the inner face of the well, said supporting projections being circumferentially spaced to permit passage of said heating unit in tilted condition and constructed and arranged to support said heating unit in said upper position, two of said supports being located approximately on one diameter of said receptacle and the other two approximately on another diameter of said receptacle disposed at an angle of not less than approximately sixty degrees nor more than approximately eighty degrees from said one diameter.

2. An electric heating device comprising a receptacle and an electric heating unit movable in said receptacle between an upper position and a lower position, said receptacle comprising means constructed and arranged to support said heating unit in said lower position and including four supporting projections on the inner face of the well, said supporting projections being circumferentially spaced to permit passage of said heating unit in tilted condition and constructed and arranged to support said heating unit in said upper position, two of said supports being located approximately on one diameter of said receptacle and the other two approximately on another diameter of said receptacle disposed at an angle of approximately seventy degrees from said one diameter.

3. A deep well cooking device comprising a receptacle and an electric heating unit movable in said receptacle between a deep well lower position and an upper position in which it is adapted for use as a surface unit, said receptacle comprising means constructed and arranged to support said heating unit in said lower position and including four supporting projections on the inner face of the well, said projections being circumferentially spaced to permit passage of said heating unit in tilted condition and constructed and arranged to support said heating unit in said upper position, two of said supports being located approximately on one diameter of said receptacle and the other two approximately on another diameter of said receptacle disposed at an angle of not less than approximately sixty degrees nor more than approximately eighty degrees from said one diameter.

4. A deep well cooking device comprising a receptacle and an electric heating unit movable in said receptacle between a deep well lower position and an upper position in which it is adapted for use as a surface unit, a terminal end portion on said heating unit extending laterally through a slot in the wall of said receptacle and effective to hold the heating unit against substantial rotation relative to said receptacle, said receptacle comprising means constructed and arranged to support said heating unit in said lower position and including four supporting projections on the inner face of the well, said supporting projections being circumferentially spaced to permit passage of said heating unit in tilted condition and arranged to support said heating unit in said upper position, two of said supports being located approximately on one diameter of said receptacle and another two on approximately another diameter of said receptacle disposed at an angle of not less than approximately sixty degrees nor more than approximately eighty degrees from said one diameter.

HARRY C. CUNNINGHAM.

REFERENCES CITED

The following references are of record in the file of this patent:

UNITED STATES PATENTS

| Number | Name | Date |
| --- | --- | --- |
| 2,481,227 | Kuenne | Sept. 6, 1949 |
| 2,519,051 | Kirk | Aug. 15, 1950 |
| 2,551,441 | Kuenne | May 1, 1951 |